US008995369B2

(12) United States Patent
Li et al.

(10) Patent No.: US 8,995,369 B2
(45) Date of Patent: Mar. 31, 2015

(54) METHOD FOR FEEDING BACK CHANNEL STATE INFORMATION, AND METHOD AND DEVICE FOR OBTAINING CHANNEL STATE INFORMATION

(75) Inventors: Bin Li, Shenzhen (CN); Hui Shen, Shenzhen (CN); Yi Luo, Shenzhen (CN); Xiaodong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 183 days.

(21) Appl. No.: 13/529,383

(22) Filed: Jun. 21, 2012

(65) Prior Publication Data

US 2012/0257579 A1    Oct. 11, 2012

Related U.S. Application Data

(63) Continuation of application No. PCT/CN2010/080081, filed on Dec. 22, 2010.

(30) Foreign Application Priority Data

Dec. 22, 2009 (CN) .......................... 2009 1 0254358

(51) Int. Cl.
*H04W 4/00* (2009.01)
*H04B 7/06* (2006.01)
(Continued)

(52) U.S. Cl.
CPC ............ *H04B 7/0639* (2013.01); *H04L 1/0026* (2013.01); *H04L 25/0204* (2013.01); *H04B 7/0626* (2013.01); *H04L 5/006* (2013.01); *H04L 2025/03802* (2013.01)
USPC ......... 370/329; 370/252; 370/328; 455/67.11

(58) Field of Classification Search
CPC ............ H04L 25/0204; H04L 27/2647; H04L 1/0026; H04L 25/021; H04L 5/006; H04W 28/0231; H04W 4/00; H04B 7/0639; H04B 7/0626; H04B 7/0632; H04B 7/063; H04B 7/0417
USPC ......... 370/278, 321, 328, 329, 347, 442, 252, 370/332; 455/67.11, 69
See application file for complete search history.

(56) References Cited

U.S. PATENT DOCUMENTS

2007/0153731 A1    7/2007  Fine
2008/0268785 A1*  10/2008  McCoy et al. ............. 455/67.11
(Continued)

FOREIGN PATENT DOCUMENTS

| CN | 101247157 A | 8/2008 |
|---|---|---|
| CN | 101262456 A | 9/2008 |
| CN | 101558581 A | 10/2009 |

OTHER PUBLICATIONS

PCT Written Opinion of the International Searching Authority dated (mailed) Mar. 31, 2011; issued in related Application No. PCT/CN2010/080081 for Huawei Tech Co., Ltd. et al.
(Continued)

*Primary Examiner* — Kwang B Yao
*Assistant Examiner* — Harun Chowdhury
(74) *Attorney, Agent, or Firm* — Slater & Matsil, L.L.P.

(57) ABSTRACT

Embodiments of the present invention provide a method for feeding back channel state information, and a method and a device for obtaining channel state information. The method for feeding back the channel state information includes: compressing, by a user equipment, original time domain channel state information to obtain compressed time domain channel state information; quantizing the compressed time domain channel state information to obtain a codebook index; and sending the codebook index to a base station. With the technical solutions provided by the embodiments of the present invention, the total overhead used for feeding back the channel state information from the user equipment to the base station is reduced.

3 Claims, 9 Drawing Sheets

(51) Int. Cl.
*H04L 1/00* (2006.01)
*H04L 25/02* (2006.01)
*H04L 5/00* (2006.01)
*H04L 25/03* (2006.01)

(56) References Cited

U.S. PATENT DOCUMENTS

2009/0016425 A1* 1/2009 Hui et al. .................. 375/240
2010/0061429 A1 3/2010 Yuen et al.
2013/0230006 A1* 9/2013 Kotecha .................... 370/329

OTHER PUBLICATIONS

PCT International Search Report dated (mailed) Mar. 31, 2011; issued in related Application No. PCT/CN2010/080081 for Huawei Tech Co., Ltd. et al.

First Chinese Office Action of Chinese Application No. 200910254358.6 mailed Aug. 24, 2012, 18 pages.

Li, Yi-peng, et al., "Information theoretic analysis on transmit power for MIMO wireless channels with imperfect feedback", Systems Engineering and Electronics, China Academic Journal Eectrnic Publishing House, Vo. 27, No. 10, Oct. 2005, 5 pages.

* cited by examiner

METHOD FOR FEEDING BACK CHANNEL STATE INFORMATION, AND METHOD AND DEVICE FOR OBTAINING CHANNEL STATE INFORMATION

CROSS-REFERENCE TO RELATED APPLICATIONS

This application is a continuation of International Application No. PCT/CN2010/080081, filed on Dec. 22, 2010, which claims priority to Chinese Patent Application No. 2009102541358.6, filed on Dec. 22, 2009, both of which are hereby incorporated by reference in their entireties.

FIELD OF THE INVENTION

The present invention relates to the field of communications technologies, and in particular, to a method for feeding back channel state information, and a method and a device for obtaining channel state information.

BACKGROUND OF THE INVENTION

The multiple-input multiple-out-put (Multiple-Input Multiple-Out-put, MIMO) technology is an important breakthrough for signal processing technologies in the field of wireless communication, which implements high speed data transmission by introducing degree of freedom of spatial dimension. However, interference between signals is caused at the same time of improving the transmission rate, the interference is demonstrated as mutual interference between signals of antennas in a point-to-point single-user MIMO system, and the interference is not only demonstrated as mutual interference between signals of antennas, but also as mutual interference between signals of users in a point-to-multi-point multi-user MIMO system.

To improve the performance of the MIMO system, several precoding methods are put forward in the prior art for reducing the interference between signals. The main precoding methods are: BD (Block Diagonalization, block diagonalization), SZF (Successive zero-forcing), THP (Tomlison-Harashima), and DPC (dirty-paper coding). In implementation, a base station usually precodes downlink data sent to a user equipment by using a method which includes but is not limited to the foregoing methods. Generally, the base station needs to obtain channel state information of the user equipment for precoding. A method for feeding back frequency domain channel state information based on a group is usually adopted in a multi-user MIMO-OFDM (Orthogonal Frequency Division Multiplexing, orthogonal frequency division multiplexing) system to obtain channel state information of the user equipment, that is, several subcarriers of each OFDM symbol are divided into a group, for example, Ng connected subcarriers may be divided into a group, and the subcarriers of each OFDM symbol are divided into: Kg=⌈k/Ng⌉ groups in total, where k is the number of the subcarriers of each OFDM symbol. The user equipment needs to quantize only the channel state information of each group of the subcarriers, and send a codebook index corresponding to the quantized channel state information of each group of the subcarriers to the base station; however, in this way, the overhead of the codebook index to be sent for each OFDM symbol of each user equipment is as high as Kg bits.

SUMMARY OF THE INVENTION

In view of the above, embodiments of the present invention provide a method for feeding back channel state information, and a method and a device for obtaining channel state information, so as to reduce the total overhead used for feeding back the channel state information from a user equipment to a base station.

The embodiments of the present invention provide the following solutions.

A method for feeding back channel state information is provided, which includes:
compressing, by a user equipment, original time domain channel state information to obtain compressed time domain channel state information;
quantizing, by the user equipment, the compressed time domain channel state information to obtain a codebook index; and
sending, by the user equipment, the codebook index to a base station.

A method for obtaining channel state information is provided, which includes:
receiving, by a base station, a codebook index sent by a user equipment;
reconstructing, by the base station, according to the codebook index, time domain channel state information compressed by the user equipment; and
obtaining, by the base station, according to the reconstructed time domain channel state information and a recovery matrix, estimated time domain channel state information of the user equipment.

A user equipment is provided, which includes:
a compression unit, configured to compress original time domain channel state information to obtain compressed time domain channel state information;
a quantization unit, configured to quantize the compressed time domain channel state information to obtain a codebook index; and
a sending unit, configured to send the codebook index to a base station.

A base station is provided, which includes:
a receiving unit, configured to receive a codebook index sent by a user equipment;
a reconstruction unit, configured to reconstruct, according to the received codebook index time domain channel state information compressed by the user equipment; and
a recovery unit, configured to obtain estimated time domain channel state information of the user equipment according to the reconstructed time domain channel state information and a recovery matrix.

In an embodiment of the present invention, the original time domain channel state information of the user equipment is compressed, the codebook index obtained by quantizing the compressed time domain channel state information is sent to the base station, and the time domain channel state information is fed back to the base station, so that the total overhead used for feeding back the channel state information from the user equipment to the base station is reduced.

In another embodiment of the present invention, the time domain state information compressed by the user equipment is reconstructed with the codebook index sent by the user equipment, and the estimated time domain state information of the user equipment is obtained with the recovery matrix, so as to obtain the channel state of the user equipment.

BRIEF DESCRIPTION OF THE DRAWINGS

To describe the technical solutions according to the embodiments of the present invention more clearly, the accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

Exemplary embodiments of the present invention are described in detail in the following, which exemplify optimal manners for implementing the present invention as expected by the inventor. As to be implemented, the present invention may be modified in different aspects without departing from the scope of the present invention. Therefore, the accompanying drawings and description are regarded as merely exemplary, but not limitative. To make the present invention clearer, the part which is not described in the specification is not described, and the same part is marked with the same reference sign.

Figure 1:
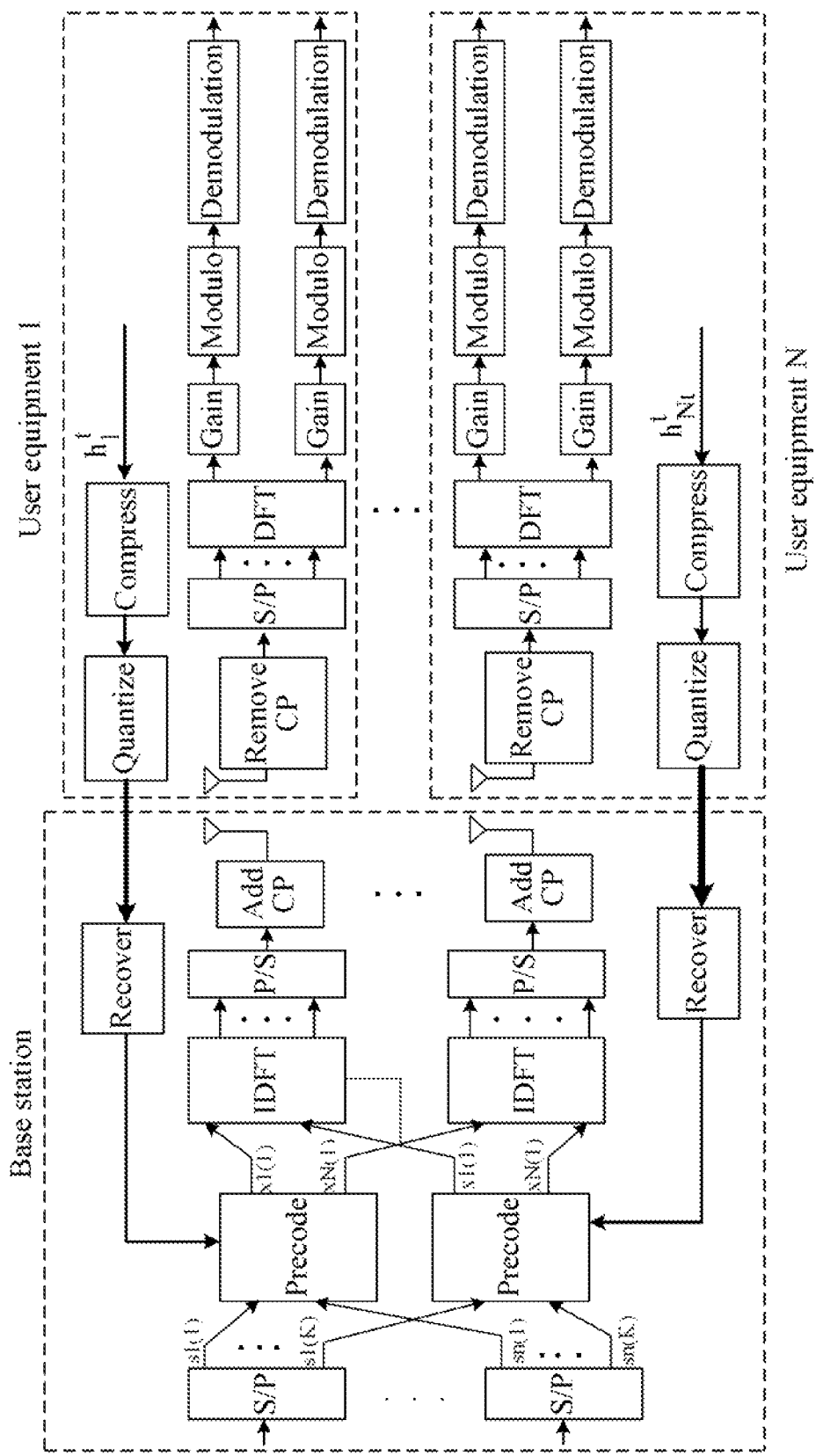
FIG. 1 is a schematic diagram of a system provided by an embodiment of the present invention.

FIG. 1 is a structural diagram of a system model according to an exemplary embodiment of the present invention.

The system includes: at least one user equipment and a base station. In this system, N user equipments may exist. The user equipment in each embodiment of the present invention includes but is not limited to the following types: a mobile terminal (MS), a PDA, and a notebook with a communication module: and the base station in each embodiment of the present invention includes but is not limited to the following types: a Base Station or a Relay Station. The following takes one user equipment as an example for description.

In this system, the user equipment compresses original time domain channel state information to obtain compressed time domain channel state information, quantizes the compressed time domain channel state information to obtain a codebook index, and sends the codebook index to the base station. The specific manner for compressing the original time domain channel state information is described in detail in the subsequent method embodiment.

The base station reconstructs time domain channel state information compressed by the user equipment with the codebook index sent by the user equipment, obtains estimated time domain channel state information of the user equipment according to the reconstructed time domain channel state information and a recovery matrix, obtains estimated frequency domain channel state information of the user equipment according to the estimated time domain channel state information of the user equipment, obtains a coding matrix using a robust linear minimum mean square error precoding formula or a robust THP precoding formula according to the estimated frequency domain channel state information of the user equipment and statistics information of channel errors, precodes, by using the obtained coding matrix, data to be sent after serial-to-parallel conversion is performed on the data, performs IDFT computation and parallel-to-serial conversion on the precoded data, and then sends the data from an antenna after a cyclic prefix CP is added to the data.

The recovery matrix is obtained according to a principle of a minimum sum of mean square errors of the time domain channel state information before being compressed. The principle of the minimum sum of the mean square errors of the time domain channel state information before being compressed is: a principle of a minimum trace for a covariance matrix of errors of the time domain channel state information before being compressed.

The statistics information of the channel errors is obtained according to the covariance matrix of the errors of the time domain channel state information before being compressed.

The user equipment, after receiving, from the antenna, the precoded signal sent by the base station, first removes the CP, and then performs serial-to-parallel conversion, DFT computation, gain processing, and modular operation on the signal, and then perform demodulation.

A time domain channel impulse response from a $j^{th}$ antenna to an $i^{th}$ user equipment is obtained by the base station, and the response is:

$$h_{i,j}(t) = \sum_{l=0}^{L-1} h_{i,j}^t(l)\delta(t - \tau_{i,j}(l)), \text{ where}$$

$$DFT \text{ is } h_{i,j}^f(k) = \sum_{l=0}^{L-1} h_{i,j}^t(l)e^{-j2\pi k f dt_{i,j}(l)},$$

and

L is the total number of paths for time delay.

$W_{i,j}$ is defined as a K×L DFT matrix from the $j^{th}$ transmit antenna to the $i^{th}$ user equipment, where K is the number of points of FFT in an orthogonal frequency division multiplexing (Orthogonal Frequency Division Multiplexing, OFDM) technology, and an element in an $i^{th}$ row and a $j^{th}$ column of the matrix is: $[W_{i,j}]_{k,l} = e^{-j2\pi k f dt_{i,j}(l)}$.

For different transmit antenna, $W_{i,1} = W_{i,2} = \ldots = W_{i,N_t} \triangleq W_i$, where $N_t$ is the number of transmit antennas.

A frequency domain channel vector of a $k^{th}$ subcarrier of the $i^{th}$ user equipment is: $h_i^f(k)=[h_{i,1}^f(k) \ldots h_{i,N_t}^f(k)]^T$, and $$h_i^f(k) = (I_{N_t} \otimes w_i^H(k)) \begin{bmatrix} h_{i,1}^t \\ \vdots \\ h_{i,N_t}^f \end{bmatrix} = (w_i^H(k) \otimes I_{N_t}) \begin{bmatrix} h_i^t(0) \\ \vdots \\ h_i^t(L-1) \end{bmatrix} \quad (1)$$
$$= (w_i^H(k) \otimes I_{N_t})h_i^t = (w_i^H(k) \otimes I_{N_t})vec(H_i^t).$$

$W_i^H(k)$ is a $k^{th}$ column of a $W_i$ matrix, and $I_{N_t}$ is a unit matrix of an $N_t$ dimension.

$H_i^t=[h_i^t(0), \ldots h_i^t(L-1)]$ is an $N_t \times L$ dimension time domain channel matrix of the $i^{th}$ user equipment.

$h_{ij}^t$ is a channel coefficient of each delay line from the $j^{th}$ antenna to the $i^{th}$ user equipment.

If the time domain channel vector $h_i^t$ is a zero mean value random vector (that is, the mean value of $h_{i,1}^t \ldots h_{i,N_t}^t$ is 0), a variance matrix of the time domain channel vector is:

$$C_{h_i^t}=E[h_i^t h_i^{tH}] \quad (2).$$

After the $i^{th}$ user equipment (i is from 1 to N) removes the CP and performs DFT conversion, a receiving signal of the $k^{th}$ subcarrier of the $i^{th}$ user equipment is:

$y_i^f(k)=h_i^f(k)x(k)+n_i^f(k)$, where $x(k)$ is a signal that is obtained after the base station performs precoding processing on a signal to be sent, and $n_i^f(k)$ is a noise.

Figure 2:
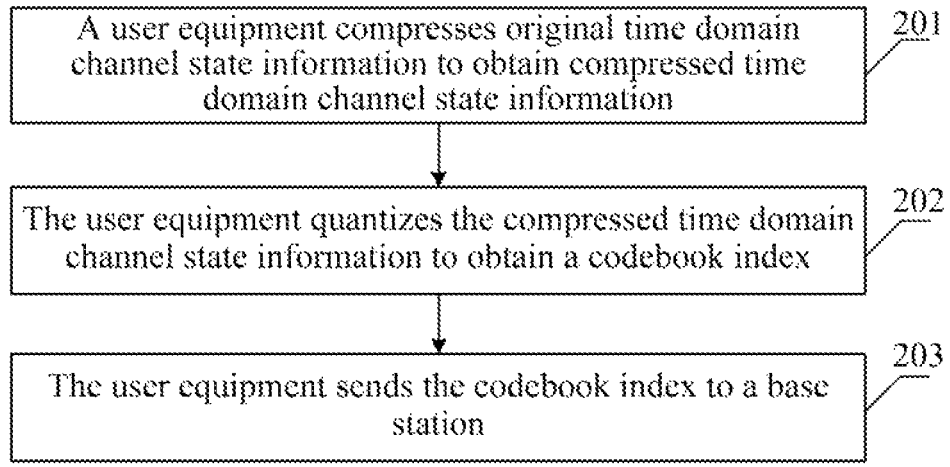
FIG. 2 is a flow chart of a method for feeding back channel state information provided by an embodiment of the present invention.

FIG. 2 is a flow chart of a method for feeding back channel state information according to an exemplary embodiment of the present invention, and the method includes the following steps:

201: A user equipment compresses original time domain channel state information to obtain compressed time domain channel state information. It should be noted that, for the user equipment, the channel state information mentioned in the embodiment of the present invention is the state information of a downlink channel. The user equipment in each embodiment of the present invention includes but is not limited to the following types: a mobile terminal (MS), a PDA, and a notebook with a communication module.

The time domain channel state information in this step may be a time domain channel state vector or a time domain channel state matrix: and if the time domain channel state information is the time domain channel state vector, the number of dimensions of the compressed time domain channel state vector is smaller than the number of dimensions of the original time domain channel state vector.

By using the feature that a variance matrix $C_{h_i^t}$ of the time domain channel vector has only limited (such as p) intrinsic values, a compression matrix is obtained, and the original time domain channel state vector of the user equipment is multiplied by the compression matrix to compress the original time domain channel state vector of the user equipment.

202: The user equipment quantizes the compressed time domain channel state information to obtain a codebook index.

The compressed time domain channel state information may be quantized by means of vector quantization or scalar quantization.

230: The user equipment sends the codebook index to a base station.

In the embodiment of the present invention, the time domain channel state information of the user equipment is compressed, the codebook index obtained by quantizing the compressed time domain channel state information is sent to the base station, and the time domain channel state information is fed back to the base station, so that the total overhead used for feeding back the channel state information from the user equipment to the base station is reduced.

Figure 3:
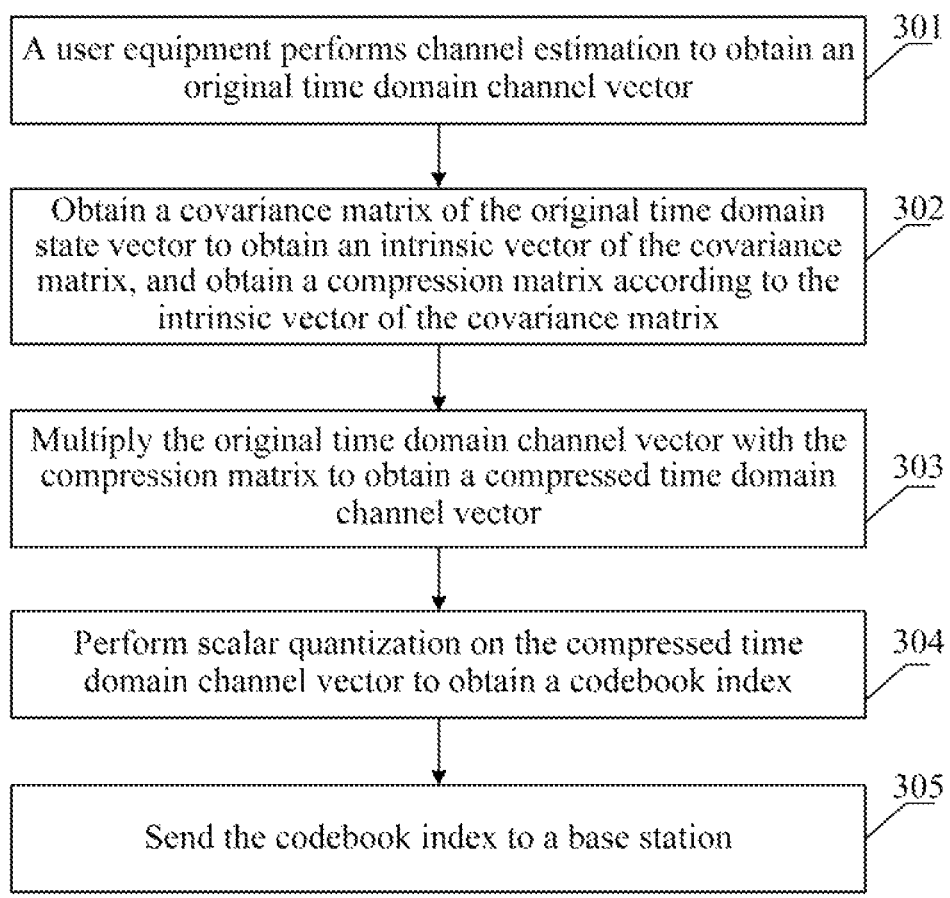
FIG. 3 is a flow chart of a method for feeding back channel state information provided by another embodiment of the present invention.

FIG. 3 is a flow chart of a method for feeding back channel state information according to another exemplary embodiment of the present invention. In the method, it is assumed that a channel model is a spatial channel model (spatial channel model, SCM) or an extend spatial channel model (extend spatial channel model, SCME) channel model, and the method includes the following steps:

301: A user equipment performs channel estimation to obtain an original time domain channel vector $h_i^t$.

302: The user equipment obtains a covariance matrix $C_{h_i^t}$ of the original time domain state vector to obtain an intrinsic vector $U_i$ of the covariance matrix $C_{h_i^t}$, and obtains a compression matrix $G_i$ according to the intrinsic vector $U_i$ of the covariance matrix $C_{h_i^t}$.

To make an error of a time domain channel vector $\hat{h}_i^t$ obtained by a base station through recovery and the original time domain channel vector $h_i^t$ as small as possible, elements in a compressed time domain channel vector $\tilde{h}_i^t$ should be as irrelative to each other as possible, and the compression matrix $G_i$ should be a whitening matrix, which satisfies the following condition:

$IE=(\tilde{h}_i^t \tilde{h}_i^{tH})=G_i C_{h_i^t} G_i^H=D_i$ (3), where $D_i \in R^{p \times p}$ and $D_i$ are diagonal matrixes.

It may be learned from formula (3) that, for a compression matrix $G_i^{opt}=\Sigma_i \tilde{U}_i^H$, $\tilde{U}_i$ is the first p columns of the intrinsic vector $U_i$, and $\Sigma_i=\text{diag}(\eta_{i,1}, \ldots \eta_{i,p})$.

303: The user equipment multiplies the original time domain channel vector with the compression matrix to obtain the compressed time domain channel vector.

304: The user equipment performs scalar quantization on the compressed time domain channel vector to obtain a codebook index.

The compressed time domain channel vector may be quantized with different quantization policies (such as a scalar quantization policy or a vector quantization policy). Considering that the actual channel state is time-varying, the data used for training the codebook may not be enough, and therefore, this embodiment chooses the scalar quantization policy.

Because the elements in the compressed time domain channel vector are irrelative to each other, the real part and the imaginary part of each element may be separately scalar quantized.

The covariance matrix of the compressed time domain channel vector is:

$$C_{\tilde{h}_i^t} \triangleq IE(\tilde{h}_i^t \tilde{h}_i^{tH})=D_i=\Sigma_i \tilde{\Lambda}_i \Sigma_i=\text{diag}(\lambda_1 \eta_1^2, \ldots, \lambda_p \eta_p^2).$$

The variance of the real part $\tilde{h}_{i,j}^{real}$ and the imaginary part $\tilde{h}_{i,j}^{imag}$ of $\tilde{h}_{i,j}^t=\tilde{h}_{i,j}^{real}-j\tilde{h}_{i,j}^{image}$ is $$\frac{1}{2}\lambda_{i,j}\eta_{i,j}^2,$$

where $j=1, \ldots, p$.

For an uniformly quantized Gaussian random variable, an optimized quantization step is $$\tilde{\mu}_{i,j}^{opt} = \mu \sqrt{\frac{1}{2}\lambda_{i,j}\mu_{i,j}^2}.$$

Therefore, a quantization codebook of the real part and the imaginary part of $\tilde{h}_{i,j}{}^t = \tilde{h}_{i,j}{}^{real} + j\tilde{h}_{i,j}{}^{imag}$ is:

$$Q_{i,j} \triangleq \left\{ \overline{h}_{i,j}(n) = \frac{2n - N - 1}{2} \tilde{u}_{i,j} \text{ for } n = 1, 2, \ldots N \right\}.$$

After the foregoing quantization method is used, the variance of a quantization error is:

$$C_{qi} = \text{diag}(\lambda_{i,1}^q, \ldots, \lambda_{i,p}^q), \text{ where}$$

$$\lambda_{i,j}^q = \frac{\tilde{u}_{i,j}^2}{6} = \frac{\mu \lambda_{i,j} \eta_{i,j}^2}{12}.$$

305: The user equipment sends the codebook index to the base station.

In the embodiment of the present invention, the time domain channel state vector of the user equipment is compressed, the codebook index obtained by quantizing the compressed time domain channel state vector is sent to the base station, and the time domain channel state information is fed back to the base station, so that the total overhead used for feeding back the channel state information from the user equipment to the base station is reduced.

Figure 4:
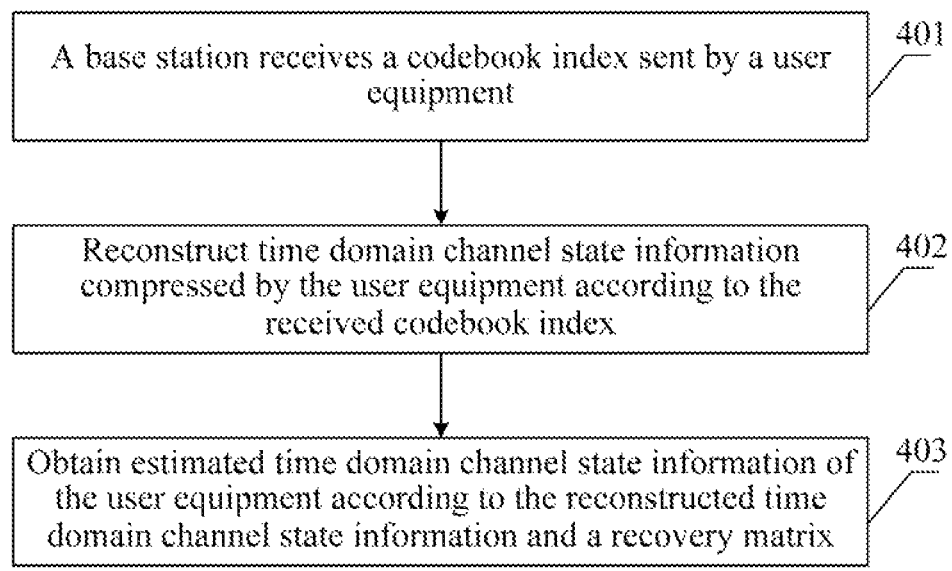
FIG. 4 is a flow chart of a method for obtaining channel state information provided by an embodiment of the present invention.

FIG. 4 is a flow chart of a method for obtaining channel state information according to an exemplary embodiment of the present invention, and the method includes the following steps:

401: A base station receives a codebook index sent by a user equipment.

It should be noted that the base station in each embodiment of the present invention includes but is not limited to the following types: a Base Station or a Relay Station.

402: The base station reconstructs, according to the received codebook index, time domain channel state information compressed by the user equipment.

The time domain channel state information in this step may be a time domain channel state vector or a time domain channel state matrix.

403: The base station obtains estimated time domain channel state information of the user equipment according to the reconstructed time domain channel state information and a recovery matrix, where the recovery matrix is obtained according to a principle of a minimum sum of mean square errors of the time domain channel state information before being compressed.

The principle of the minimum sum of the mean square errors of the time domain channel state information before being compressed is: a principle of a minimum trace for a covariance matrix of errors of the time domain channel state information before being compressed.

In the embodiment of the present invention, the time domain channel state information compressed by the user equipment is reconstructed with the codebook index sent by the user equipment, and the estimated time domain channel state information of the user equipment is obtained with the recovery matrix, so that the channel state of the user equipment is obtained.

Figure 5:
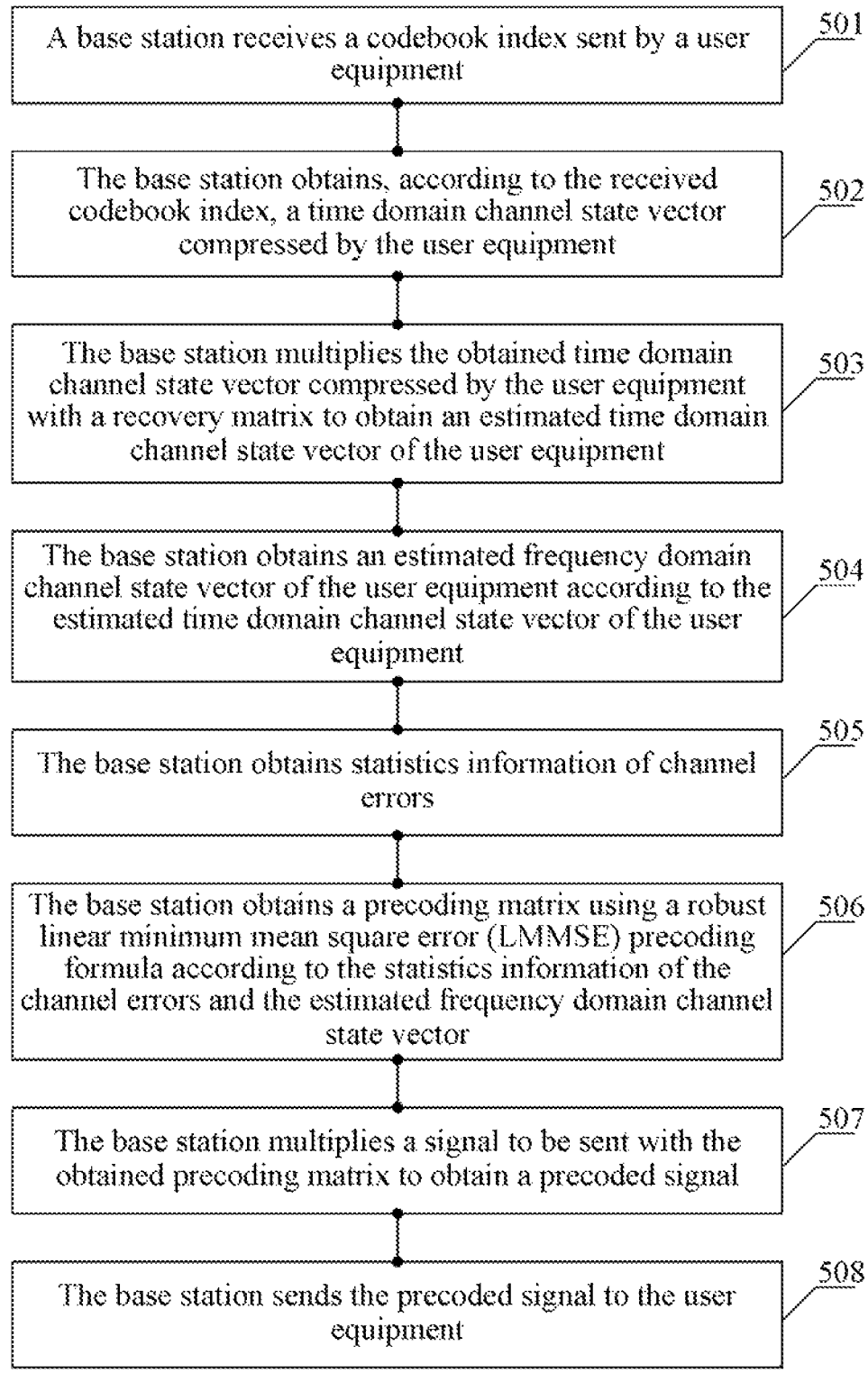
FIG. 5 is a flow chart of a method for obtaining channel state information and a precoding method provided by another embodiment of the present invention.

FIG. 5 is a flow chart of a method for obtaining channel state information according to another exemplary embodiment of the present invention, and the method includes the following steps:

501: A base station receives a codebook index sent by a user equipment.

502: The base station obtains, according to the received codebook index, the real part and the imaginary part of each element in a time domain channel state vector compressed by the user equipment, and further obtains the time domain channel state vector compressed by the user equipment.

503: The base station multiplies the obtained time domain channel state vector compressed by the user equipment with a recovery matrix to obtain an estimated time domain channel state vector or the user equipment.

The recovery matrix satisfies the following condition:

$$V_i^{opt} = \arg_{V_i}{}^{min\ tr}(C_{h_i^t}) \tag{4}$$

where $C_{h_i^t}$ is a covariance matrix of errors of the time domain channel state vector:

$$C_{\xi_i^t} \triangleq E\left[ (h_i^t - \hat{h}_i^t)(h_i^t - \hat{h}_i^t)^H \right]$$
$$= C_{h_i^t} + V_i G_i C_{h_i^t} G_i^H V_i^H - V_i G_i C_{h_i^t} - C_{h_i^t} G_i^H V_i^H +$$
$$V_i C_{qi} V_i^H.$$

The foregoing formula may be simplified as:

$$C_{h_i^t} = C_{h_i^t} + V_i \Sigma_i \tilde{\Lambda}_i \Sigma_i V_i^H + V_i \Sigma_i \tilde{\Lambda}_i \tilde{U}_i^H - \tilde{U}_i \tilde{\Lambda}_i \Sigma_i V_i + V_i C_{qi} V_i^H, \text{ and}$$

$$\partial tr(C_{h_i^t}) / \partial V_i^* = 0.$$

Therefore, the recovery matrix of an $i^{th}$ user equipment may be obtained as:

$$V_i^{opt} = \tilde{U}_i \tilde{\Lambda}_i \Sigma_i [\Sigma_i \tilde{\Lambda}_i \Sigma_i + C_{qi}]^{-1}, \text{ where}$$

$$\tilde{U}_i^H C_{h_i^t} \tilde{U}_i = \tilde{\Lambda}_i.$$

$C_{q_i}$ is the variance of errors introduced when the time domain channel state vector compressed by the user equipment is reconstructed.

504: The base station obtains an estimated frequency domain channel state vector of the user equipment according to the estimated time domain channel state vector of the user equipment.

505: The base station obtains statistics information of channel errors. The statistics information of the channel errors is a frequency domain channel error variance matrix $C_\Theta(k)$.

Step 504 and step 505 have no time order, step 505 may be performed before step 504, or the two steps are performed at the same time.

In actual application, due to causes such as quantization and delay of feedback, the estimated frequency domain channel state vector of the user equipment obtained by the base station is inaccurate, and the vector is recorded as $\hat{H}^f(k)$, where $$\hat{H}^f(k) = [\hat{h}_1^f(k), \ldots, \hat{h}_{N_t}^f(k)]^T.$$

The frequency domain channel error variance matrix $C_\Theta(k)$ is:

$$C_\Theta(k) = E\left[ \Theta^f(k)^H \Theta^f(k) \right] \tag{5}$$
$$= E\left\{ (H^f(k) - \hat{H}^f(k))^H (H^f(k) - \hat{H}^f(k)) \right\} -$$
$$\sum_{i=1}^{N_u} E\left[ (h_i^f(k)^* - \hat{h}_i^f(k)^*)(h_i^f(k)^T - \hat{h}_i^f(k)^T) \right]$$

-continued $$= \left\{ \sum_{i=1}^{N} (w_i^H(k) \otimes I_{N_t}) \right.$$

$$E\left[(h_i^t - \hat{h}_i^t)(h_i^t - \hat{h}_i^t)^H\right](w_i^H(k) \otimes I_{N_t})^H \right\}$$

$$= \sum_{i=1}^{N} (w_i^H(k) \otimes I_{N_i})^* C_{c_i^T}^T (w_i^H(k) \otimes I_{N_t})^T,$$

where $C_{E_2} = E[(h_i^t - \hat{h}_i^t)(h_i^t - \hat{h}_i^t)^H]$ is the covariance matrix of the errors of the time domain channel state vector before being compressed, which may be a statistical value measured previously.

506: The base station obtains a precoding matrix using a robust linear minimum mean square error (LMMSE) precoding formula according to the statistics information of the channel errors and the estimated frequency domain channel state vector.

The frequency domain channel state vector in the robust LMMSE precoding formula is a sum of the estimated frequency domain channel state vector and the frequency domain channel error variance matrix ($H=\hat{H}+\Theta$).

The precoding matrix of the LMMSE multi-user equipment may be obtained according to the following formula:

$$\{F_{MMSE}, \beta_{MMSE}\} = \arg\min_{F,\beta} E_s\{\|s - \hat{s}\|_2^2\}. \tag{6}$$

The constraint condition is as follows:
$E\{\|Fs\|_2^2\}=P$, that is, the total transmit power is P.
The conventional solution is: $F_{MMSE}=\beta_{MMSE}\Omega^{-1}\hat{H}^H$, where
$\beta_{MMSE}$ is a normalized coefficient $$\beta_{MMSE} = \frac{P}{tr[\Psi^{-2}\hat{H}^H R_s \hat{H}]},$$

$$\Psi \triangleq \hat{H}^H \hat{H} + \frac{N_u}{P}\sigma^2 I_{N_t} \text{ and } R_s = E(ss^H).$$

The precoding matrix in the embodiment of the present invention is obtained by substituting $H=\hat{H}+\Theta$ into formula (6), where $\Theta$ is a channel error, and a Lagrangian function $L(F, \beta)$ is obtained by substituting $H=\hat{H}+\Theta$ into formula (6):

$$L(F, \beta) = tr\{IE[(s - s^H)(s - s^H)]\} + \lambda[tr(FR_s F^H) - P]$$

$$= tr\{\beta^{-2} FR_s F^H(\hat{H}^H \hat{H} + C_\Theta) -$$

$$\beta^{-1} \text{Re}(\hat{H}FR_s) + \beta^{-2}\sigma^2 I\} + \lambda[tr(FR_s F^H) - P].$$

Differentiate $L(F, \beta)$ to obtain the precoding matrix $F_{RMMSE}=\beta_{RMMSE}\tilde\Omega^{-1}\hat{H}^H$, where
$\beta_{RMMSE}$ is a normalized coefficient $$\beta_{RMMSE} = \frac{P}{tr[\tilde\Psi^{-2}\hat{H}^H R_s \hat{H}]}, \text{ where } \tilde\Psi \triangleq \hat{H}^H\hat{H} + C_\Theta + \frac{N_u}{P}\sigma^2 I_{N_t}.$$

507: The base station multiplies a signal to be sent with the obtained precoding matrix. that is, $s \times F_{RMMSE}$, to obtain a precoded signal.

508: The base station sends the precoded signal to the user equipment.

Subsequently, the user equipment, after receiving the precoded signal sent by the base station, decodes the received signal with a decoding coefficient $\beta_i=(r^*R^{-1})y_i$, where
$y_i$ is the precoded signal sent by the base station,
$R=E[|y_i|^2]=h_i^T FR_s F^H h_i^* + \sigma_n^2$,
$r=E[y_i s_k^*]=h_i^T FR_s e_i$,
F is the precoding matrix, $R_s$ is a signal relative matrix, and
$\sigma_n$ is the variance of the noise.

In the embodiment of the present invention, the time domain channel state vector compressed by the user equipment is first reconstructed with the codebook index sent by the user equipment, and the estimated time domain channel state vector of the user equipment is then obtained with the recovery matrix, so as to obtain the channel state of the user equipment; and further, the estimated frequency domain channel state vector of the user equipment is obtained with the estimated time domain channel state vector of the user equipment. Considering that the estimated frequency domain channel state information of the user equipment is inaccurate due to causes such as quantization and delay of feedback, the base station obtains the precoding matrix using the robust LMMSE precoding formula according to the statistics information of the channel errors and the estimated frequency domain channel state information, and precodes the signal to be sent with the obtained precoding matrix, so that the performance degradation caused by inaccurate estimated channel state information may be prevented.

Figure 6:
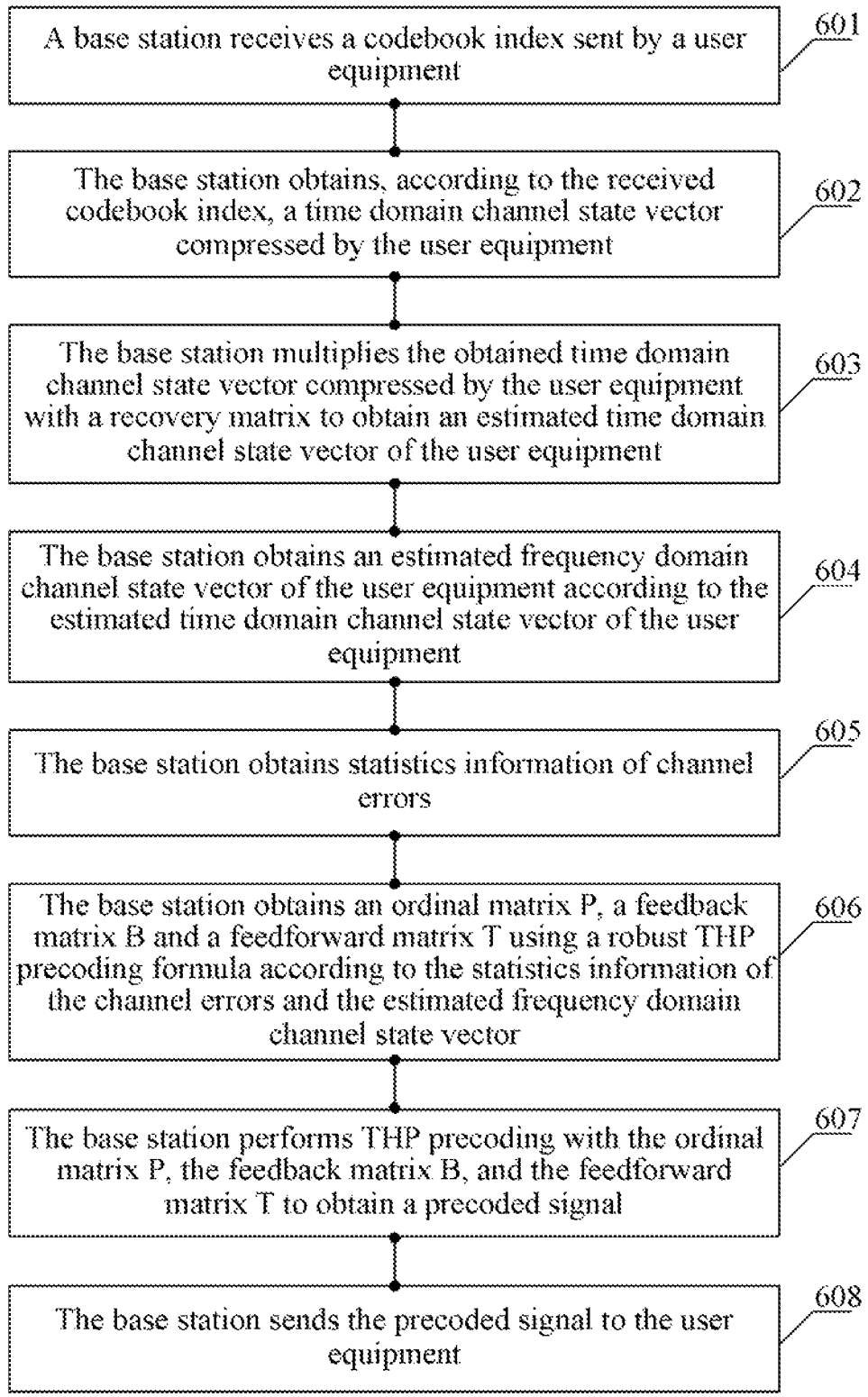
FIG. 6 is a flow chart of a method for obtaining channel state information and a precoding method provided by still another embodiment of the present invention.

FIG. 6 is a flow chart of a method for obtaining channel state information according to another exemplary embodiment of the present invention, and the method includes the following steps:

Step 601 to step 605 are the same as step 501 to step 505 in the foregoing embodiment, which are not described herein again.

606: The base station obtains an ordinal matrix P, a feedback matrix B and a feedforward matrix T using a robust THP precoding formula according to the statistics information of the channel errors and the estimated frequency domain channel state vector.

The frequency domain channel state vector in the robust THP precoding formula is a sum of the estimated frequency domain channel state vector and the frequency domain channel error variance matrix ($H=\hat{H}+\Theta$).

Figure 7:
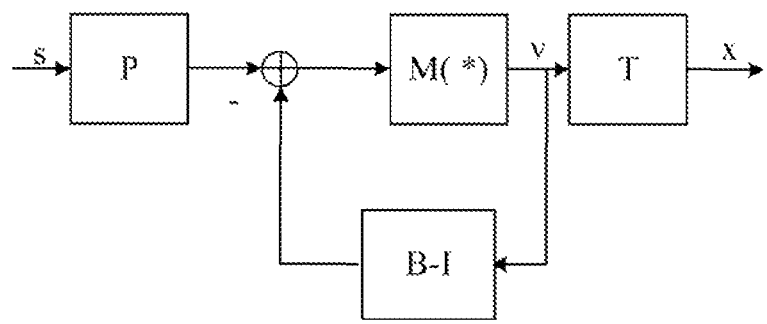
FIG. 7 is a schematic diagram of conventional base station side processing in a THP precoding method.

A schematic diagram of conventional base station side processing by using a THP precoding method is shown in FIG. 7, where B is a feedback matrix. T is a feedforward matrix. P is an ordinal matrix, I is a unit matrix. M ( ) is an modular operation, and Q ( ) is an demodulation operation.

A solution formula of a THP precoding relative matrix is shown in formula (7):

$$\{T_{THP}, B_{THP}, \beta_{THP}\} = \arg\min_{T,B,\beta} tr\{E_v[(d-\hat{d})(d-\hat{d})^H]\}. \tag{7}$$

The constraint condition is: $E(\|x\|_2^2)=tr(T^H\Phi_v T)=P$.

P is transmit power, $d=P^TBv$, $\hat{d}=\beta^{-1}HTv+\beta^{-1}n$, where $\beta \in R^*$, d is a transmitting signal, V is the signal after modulo, H is a channel matrix, and its non-robust solution is:

$$T = \beta \tilde{T}, B = L^{-1}, \beta = \sqrt{P/\chi},$$

$$P\Phi^{-1}P^T = L^H DL, \text{ where } \Phi \underline{\underline{\Delta}} \hat{H}\hat{H}^H + \frac{\sigma^2 N_u}{P} I_{N_u},$$

$$\tilde{T} = \hat{H}^H P^T L^H D, \chi = \|\tilde{T}(:,I)\|_2^2 + \sigma_v^2 \|\tilde{T}(:,2:N_u)\|_F^2,$$

$$\text{where } \sigma_v^2 = \sigma_{v_1}^2 = \frac{2}{3}M\gamma^2.$$

In the embodiment of the present invention, $H=\hat{H}+\Theta$ is substituted into formula (7) to obtain:

$$tr\{IE_v[(d-\hat{d})(d-\hat{d})^H]\} =$$
$$tr\{\beta^{-2}T\Phi_T T^H \hat{H}^H \hat{H}\} + tr\{\beta^{-2}T\Phi_Y T^H C_\Theta\} + tr\{P^T B\Phi_Y B^H P\} -$$
$$tr\{\beta^{-1}\hat{H}T\Phi_Y B^H P\} - tr\{\beta^{-1}P^T B\Phi_V T^H \hat{H}^H\} + tr\{\beta^{-2}\sigma^2 I\}.$$

The frequency domain channel error variance matrix $C_\Theta(k)$ is obtained according to formula (5).

A robust solution is:

$$T = \beta \tilde{T}, B = L^{-1}, \beta = \sqrt{P/\chi},$$

$$P\Phi^{-1}P^T = L^H DL, \text{ where } \Phi = \hat{H}\hat{H}^H + C_\Theta + \frac{\sigma^2 N_u}{P} I_{N_u},$$

$$\tilde{T} = \hat{H}^H P^T L^H D, \chi = \|\tilde{T}(:,I)\|_2^2 + \sigma_v^2 \|\tilde{T}(:,2:N_u)\|_F^2,$$

$$\text{where } \sigma_v^2 = \sigma_{v_i}^2 = \frac{2}{3}M\gamma^{-2}.$$

It may be seen from the foregoing analysis that, the main difference between the robust solution and the non-robust solution obtained through substituting $H=\hat{H}+\Theta$ into formula (7) lies in that $\Phi$ is different.

The specific solution process is as follows:

$$\Phi = \hat{H}\hat{H}^H + C_\Theta + \frac{\sigma^2 N_u}{P} I_{N_u}$$

is solved first, and then $\Phi$ is substituted into a formula $P\Phi^{-1}P^T=L^HDL$, where the ordinal matrix P is known, and a matrix L and a matrix D are solved with the formula: the matrix L is substituted into a formula $B=L^{-1}$ to solve the feedback matrix B; and the matrix L and the matrix D are substituted into $\tilde{T}=\hat{H}^HP^TL^HD$ to solve the feedforward matrix T.

607: The base station performs THP precoding with the ordinal matrix P, the feedback matrix B, and the feedforward matrix T to obtain a precoded signal.

Figure 8:
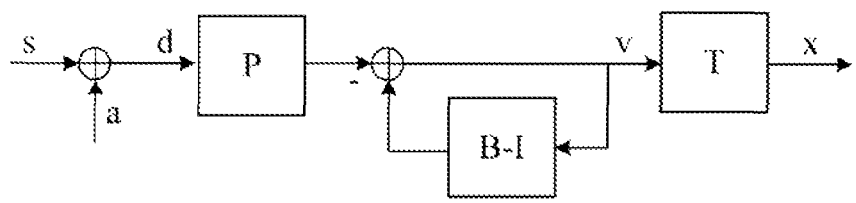
FIG. 8 is a schematic diagram a base station side processing in a THP precoding method provided by an embodiment of the present invention.

FIG. 8 is a schematic diagram of base station side processing by using a THP precoding method, which is an equivalent diagram of FIG. 7. In this step, the base station performs THP precoding in the manner shown in the schematic diagram of FIG. 8, where s is a signal to be sent, I is a unit matrix, and a is a parameter of the modular operation, which depends on the modulation manner.

608: The base station sends the precoded signal to the user equipment.

Subsequently, the user equipment, after receiving the precoded signal sent by the base station, decodes the received signal with a decoding coefficient $\beta_i=(r^*R^{-1})y_i$, where $y_i$ is the precoded signal sent by the base station, $R=E[|y_i|^2]=h_i^T T\Phi_v T^H h_i^* + \sigma_n^2$, $r=E[y_i s_k^*]=h_i^T T\Phi_v B^H Pe_i$, $\Phi_v$ is the variance of v, v is the signal after modulo, and e is a quantization error.

In the embodiment of the present invention, the time domain channel state vector compressed by the user equipment is first reconstructed with the codebook index sent by the user equipment, and the estimated time domain channel state vector of the user equipment is then obtained with the recovery matrix, so as to obtain the channel state of the user equipment; and further, the estimated frequency domain channel state vector of the user equipment is obtained with the estimated time domain channel state vector of the user equipment. Considering that the estimated frequency domain channel state vector of the user equipment obtained by the base station is inaccurate due to causes such as quantization and delay of feedback, the base station obtains the ordinal matrix P, the feedback matrix B and the feedforward matrix T using the robust THP precoding formula according to the statistics information of the channel errors and the estimated frequency domain channel state vector, and precodes the signal to be sent with the obtained matrixes, so that the performance degradation caused by inaccurate estimated channel state information may be prevented.

Figure 9:
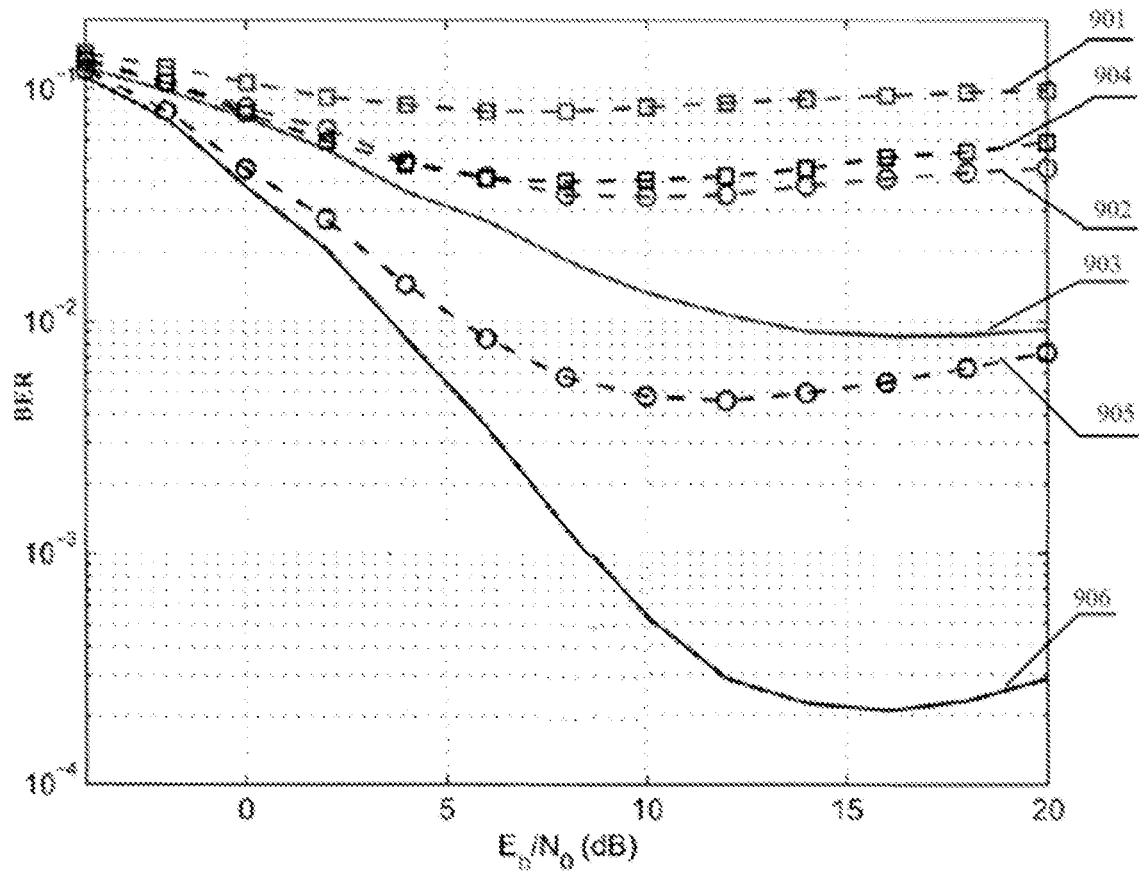
FIG. 9 is a schematic comparison diagram of performance under different manners for feeding back channel state information provided by an embodiment of the present invention.

To better describe the beneficial effects brought by the embodiment of the present invention, FIG. 9 shows the difference between the LMMSE precoding algorithm and the THP precoding algorithm under different methods for feeding back channel state information: the simulation conditions are that the number of transmit antennas Nt=4, the number of user equipments Nu=4, each user equipment uses a single antenna, a central frequency of the system is 2 GHz, 512-point OFDM is provided, a subcarrier interval is 15 KHz, the channel is of a 3GPP spatial channel model (spatial channel model, SCM), and QPSK modulation is adopted. A line 901 indicates a schematic relation diagram between BER and $E_b/N_0$ by adopting the LMMSE precoding algorithm, the scalar quantization manner, FB=832, and the frequency domain feedback solution based on the group: a line 902 indicates a schematic relation diagram between BER and $E_b/N_0$ by adopting the LMMSE precoding algorithm, the vector quantization manner, FB=832 and the frequency domain feedback solution based on the group: a line 903 indicates a schematic relation diagram between BER and $E_b/N_0$ by adopting the LMMSE precoding algorithm, the scalar quantization manner. FB=96, and based on the time domain compression solution (compression dimension (dim) is 12) provided by the present invention; a line 904 indicates a schematic relation diagram between BER and $E_b/N_0$ by adopting the THP precoding algorithm, the scalar quantization manner, B=832, and the frequency domain feedback solution based on the group: a line 905 indicates a schematic relation diagram between BER and $E_b/N_0$ by adopting the THP precoding algorithm, the vector quantization manner, B=832, and the frequency domain feedback solution based on the group; and a line 906 indicates a schematic relation diagram between BER and $E_b/N_0$ by adopting the THP precoding algorithm, the vector quantization manner. B=96, and based on the time domain compression solution (compression dimension (dim) is 12, and the compression dimension is the p value in the foregoing embodiment) provided by the present invention. It may be seen from the figure that, for the LMMSE precoding algorithm and the THP precoding algorithm, no matter whether the scalar quantization solution or the vector quantization solution is adopted, the number of bits occupied for feeding back the time domain channel state information is smaller than the number of bits occupied for feeding back the frequency domain channel state information, and in the case of the same feedback overhead, more channel state information may be fed back with the solution provided by the embodiment of the present invention, and therefore, the performance of LMMSE precoding and THP precoding for feeding back the time domain channel state information provided by the embodiment of the present invention is obviously better than the performance of LMMSE precoding and THP precoding for feeding back the frequency domain channel state information $E_b$ in FIG. 9 and the subsequent drawings represent the energy of each information bit. $N_0$ represents the error of the noise, FB is the total bit number of the whole feedback, and B is the bit number of the feedback by each subcarrier.

Figure 10:
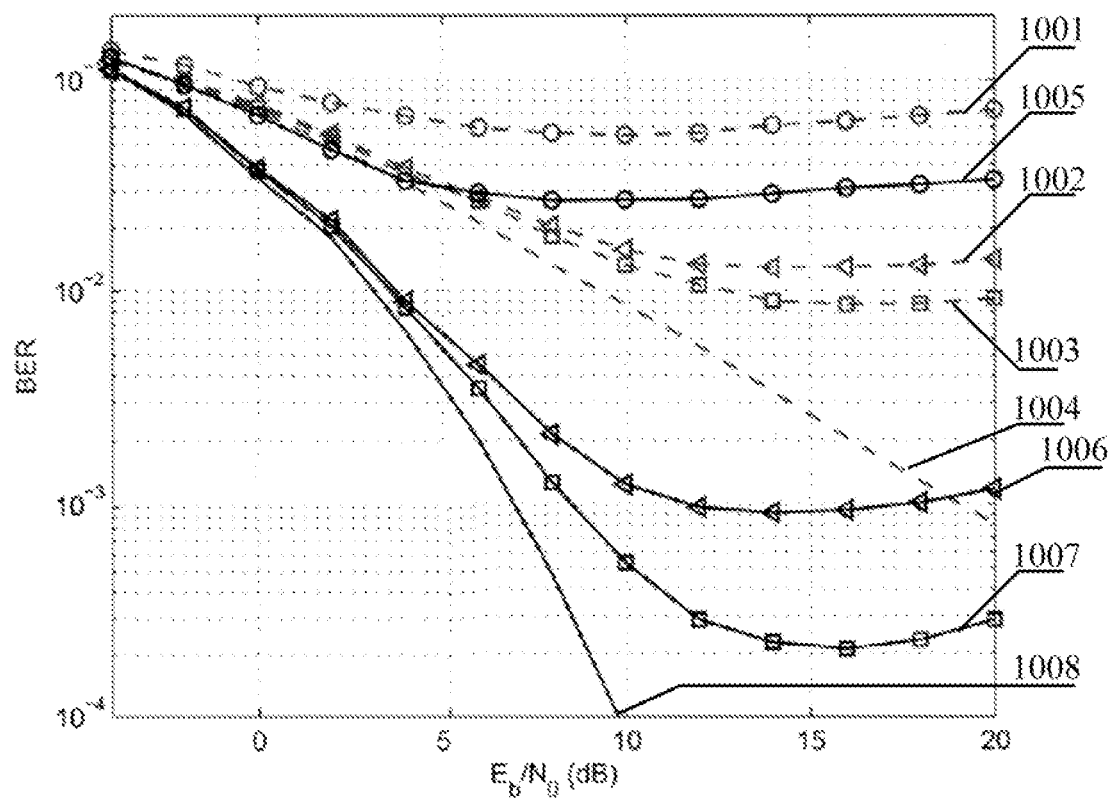
FIG. 10 is a schematic comparison diagram of performance of a manner for feeding back time domain channel state information under different codebook sizes and compression dimensions provided by an embodiment of the present invention.

FIG. 10 is a schematic diagram of performance of a method for feeding back time domain channel state information under different codebook sizes and compression dimensions provided by an embodiment of the present invention, where a line 1001 indicates a schematic relation diagram between BER and $E_b/N_0$ by adopting LMMSE precoding B=2, and Dim=24: a line 1002 indicates a schematic relation diagram between BER and $E_b/N_0$ by adopting LMMSE precoding, B=6, and Dim=8; a line 1003 indicates a schematic relation diagram between BER and $E_b/N_0$ by adopting LMMSE precoding, B=4, and Dim=12; a line 1004 indicates a schematic relation diagram between BER and $E_b/N_0$ by adopting LMMSE precoding, B=4, and in a condition that a transmitting end precisely learns the channel state information (Perfect CSIT); a line 1005 indicates a schematic relation diagram between BER and $E_b/N_0$ by adopting THP precoding, B=2, and Dim=24: a line 1006 indicates a schematic relation diagram between BER and $E_b/N_0$ by adopting. THP precoding, B=6, and Dim=8: a line 1007 indicates a schematic relation diagram between BER and $E_b/N_0$ by adopting THP precoding, B=4, and Dim=12; and a line 1008 indicates a schematic relation diagram between BER and $E_b/N_0$ by adopting THP precoding, B=4, and Perfect CSIT. It may be seen from FIG. 10 that, the performance is best when the compression dimension (dim) is 12 (the total feedback overhead is fixed at 96 bits).

Figure 11:
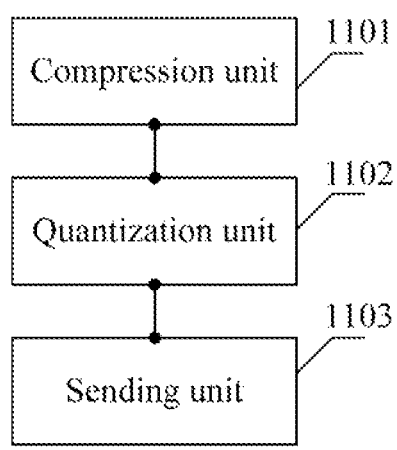
FIG. 11 is a structural diagram of a user equipment provided by an embodiment of the present invention.

FIG. 11 is a structural diagram of a user equipment according to an exemplary embodiment of the present invention, and the user equipment includes:
 a compression unit 1101, configured to compress original time domain channel state information to obtain compressed time domain channel state information;
 a quantization unit 1102, configured to quantize the compressed time domain channel state information to obtain a codebook index: and
 a sending unit 1103, configured to send the codebook index to a base station.

Specifically, the compression unit 1101 includes: a compression matrix obtaining subunit, configured to obtain a covariance matrix of an original time domain channel state vector. obtain an intrinsic vector of the covariance matrix, and obtain a compression matrix according to the intrinsic vector of the covariance matrix; and a compression subunit, configured to multiply the original time domain channel state vector with the compression matrix to obtain the compressed time domain channel state vector.

In the user equipment of the embodiment of the present invention, the original time domain channel state information is compressed, the codebook index obtained by quantizing the compressed time domain channel state information is sent to the base station, and the time domain channel state information is fed back to the base station, so that the total overhead used for feeding back the channel state information from the user equipment to the base station is reduced.

Figure 12A:
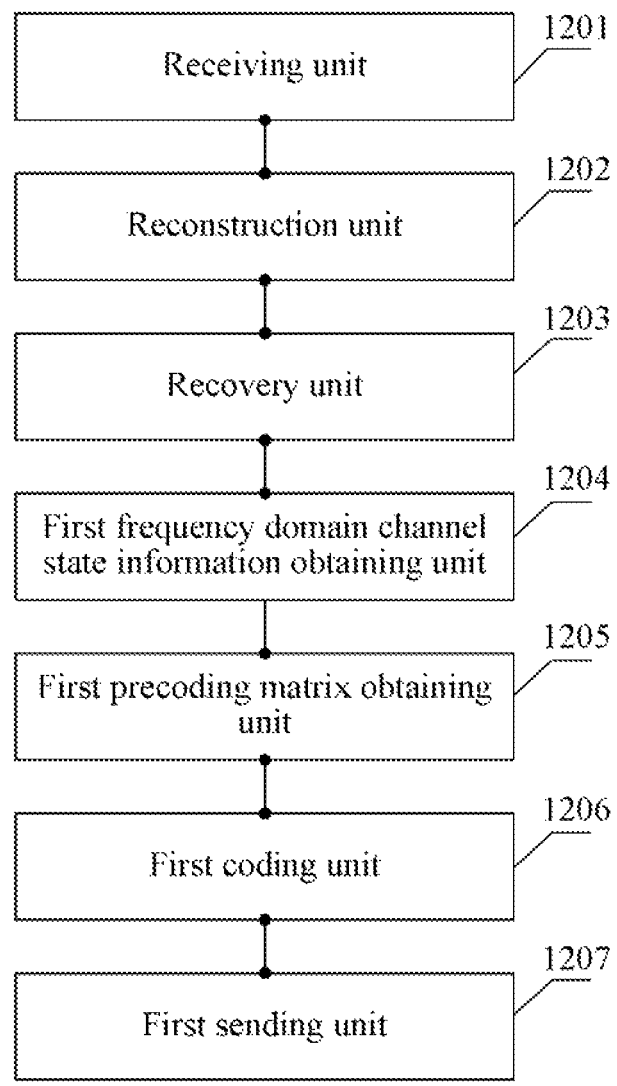
FIG. 12A is a structural diagram of a base station provided by an embodiment of the present invention.
Figure 12B:
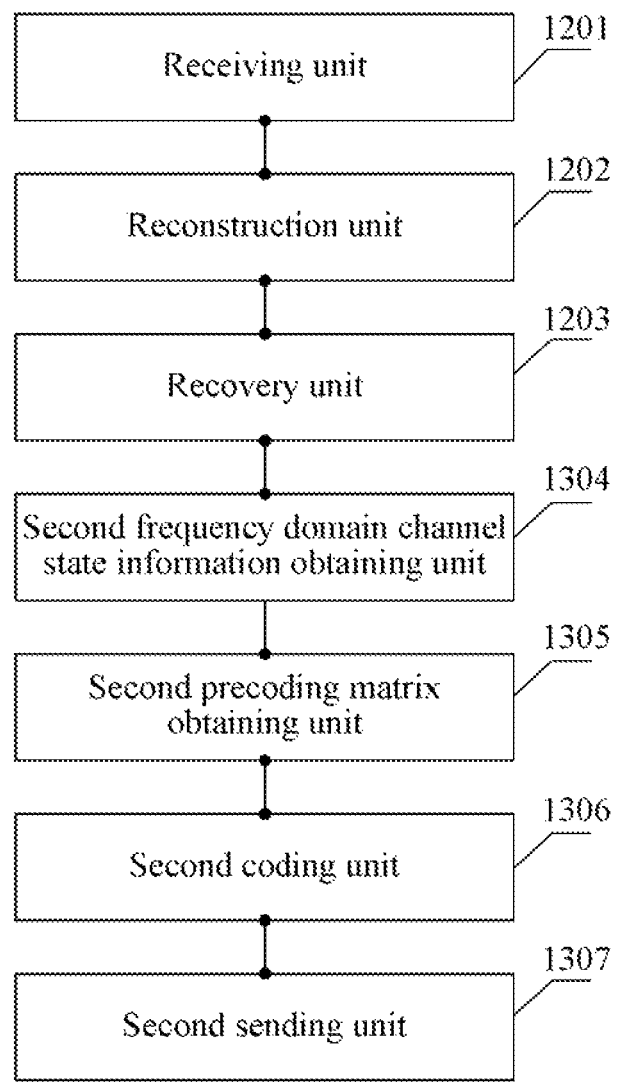
FIG. 12B is a structural diagram of another base station provided by an embodiment of the present invention.

FIG. 12A and FIG. 12B are structural diagrams of a base station according to an exemplary embodiment of the present invention, and the user equipment includes:
 a receiving unit 1201, configured to receive a codebook index sent by a user equipment:
 a reconstruction unit 1202, configured to reconstruct, according to the received codebook index, time domain channel state information compressed by the user equipment: and
 a recovery unit 1203, configured to obtain estimated time domain channel state information of the user equipment according to the reconstructed time domain channel state information and a recovery matrix.

The recovery matrix is obtained according to a principle of a minimum sum of mean square errors of the time domain channel state information before being compressed. The principle of the minimum sum of the mean square errors of the time domain channel state information before being compressed is: a principle of a minimum trace for a covariance matrix of errors of the time domain channel state information before being compressed.

Referring to FIG. 12A, the base station further includes: a first frequency domain channel state information obtaining unit 1204, configured to obtain estimated frequency domain channel state information of the user equipment according to the estimated time domain channel state information of the user equipment: a first precoding matrix obtaining unit 1205, configured to obtain a precoding matrix using a robust linear minimum mean square error precoding formula according to the estimated frequency domain channel state information of the user equipment and statistics information of channel errors, where the statistics information of the channel errors is obtained according to the covariance matrix of the errors of the time domain channel state information before being compressed; a first coding unit 1206, configured to multiply a signal to be sent with the obtained precoding matrix to obtain a precoded signal; and a first sending unit 1207, configured to send the precoded signal to the user equipment.

Referring to FIG. 12B, the base station further includes: a second frequency domain channel state information obtaining unit 1304, configured to obtain the estimated frequency domain channel state information of the user equipment according to the estimated time domain channel state information of the user equipment; a second precoding matrix obtaining unit 1305 configured to obtain an ordinal matrix P, a feedback matrix B, and a feedforward matrix T using a robust THP precoding formula according to the estimated frequency domain channel state information of the user equipment and the statistics information of the channel errors, where the statistics information of the channel errors is obtained according to the covariance matrix of the errors of the time domain channel state information before being compressed: a second coding unit 1306, configured to perform THP precoding on a signal to be sent to obtain a precoded signal according to the ordinal matrix P, the feedback matrix B and the feedforward matrix T; and a second sending unit 1307, configured to send the precoded signal to the user equipment.

In the embodiment of the present invention, the time domain channel state vector compressed by the user equipment is first reconstructed with the codebook index sent by the user equipment, and the estimated time domain channel state vector of the user equipment is then obtained with the recovery matrix, so as to obtain the channel state of the user equipment: and further, the estimated frequency domain channel state vector of the user equipment is obtained with the estimated time domain channel state vector of the user equipment. Considering that the estimated frequency domain channel state information of the user equipment is inaccurate due to causes such as quantization and delay of feedback, the base station, obtains the precoding matrix using the robust LMMSE precoding formula according to the statistics information of the channel errors and the estimated frequency domain channel state information, and precodes the signal to be sent with the obtained precoding matrix; or obtains the ordinal matrix P, the feedback matrix B and the feedforward matrix T using the robust THP precoding formula, and precodes the signal to be sent with the obtained matrix, so that the performance degradation caused by inaccurate estimated channel state information may be prevented.

Persons of ordinary skill in the art can understand that all or a part of steps in the method of the above embodiments may be implemented by programs instructing relevant hardware, and the programs may be stored in a computer readable storage medium, such as a Read-Only Memory (ROM), a magnetic disc, or an optical disc.

The method for feeding back the channel state information, and the method and the device for obtaining the channel state information provided by the embodiments of the present invention are described in detail above. The principle and implementation of the present invention are described herein through specific examples. The description about the embodiments of the present invention is merely provided for ease of understanding of the method and core ideas of the present invention. Persons of ordinary skill in the art can make variations and modifications to the present invention in terms of the specific implementations and application scopes according to the ideas of the present invention. Therefore, the specification shall not be construed as a limit to the present invention.

What is claimed is:

1. A method for feeding back channel state information, comprising:
    compressing, by a user equipment, original time domain channel state information to obtain compressed time domain channel state information;
    quantizing, by the user equipment, the compressed time domain channel state information to obtain a codebook index; and
    sending, by the user equipment, the codebook index to a base station;
    wherein the original time domain channel state information is an original time domain channel state vector; and
    wherein compressing the original time domain channel state information comprises:
        obtaining, by the user equipment, a covariance matrix of the original time domain channel state vector;
        obtaining, by the user equipment, an intrinsic vector of the covariance matrix;
        obtaining, by the user equipment, a compression matrix according to the intrinsic vector of the covariance matrix; and
        multiplying the original time domain channel state vector of the user equipment with the compression matrix to obtain a compressed time domain channel state vector.

2. The method according to claim 1, wherein a manner of quantizing the compressed time domain channel state information comprises: scalar quantization or vector quantization.

3. A user equipment, comprising:
    a compression unit, configured to compress original time domain channel state information to obtain compressed time domain channel state information;
    a quantization unit, configured to quantize the compressed time domain channel state information to obtain a codebook index; and
    a sending unit, configured to send the codebook index to a base station;
    wherein the original time domain channel state information is an original time domain channel state vector; and
    wherein the compression unit comprises:
        a compression matrix obtaining subunit, configured to obtain a covariance matrix of the original time domain channel state vector, obtain an intrinsic vector of the covariance matrix, and obtain a compression matrix according to the intrinsic vector of the covariance matrix; and
        a compression subunit, configured to multiply the original time domain channel state vector with the compression matrix to obtain a compressed time domain channel state vector.

* * * * *